United States Patent
Woo

(10) Patent No.: US 7,708,245 B2
(45) Date of Patent: May 4, 2010

(54) MULTI-PURPOSE VACUUM SUCTION APPARATUS

(76) Inventor: Cheol-Seok Woo, 345-9 Gasan-Dong, Geumcheon-Gu, B-811 SK Twintech Tower B/D, Seoul (KR) 153-773

( * ) Notice: Subject to any disclaimer, the term of this patent is extended or adjusted under 35 U.S.C. 154(b) by 0 days.

(21) Appl. No.: 12/297,425

(22) PCT Filed: Apr. 24, 2007

(86) PCT No.: PCT/KR2007/001982

§ 371 (c)(1),
(2), (4) Date: Oct. 16, 2008

(87) PCT Pub. No.: WO2007/123354

PCT Pub. Date: Nov. 1, 2007

(65) Prior Publication Data

US 2009/0121102 A1 May 14, 2009

(30) Foreign Application Priority Data

Apr. 24, 2006 (KR) .................. 20-2006-0010896 U

(51) Int. Cl.
*F16B 47/00* (2006.01)
(52) U.S. Cl. .................................... 248/205.7; 248/362
(58) Field of Classification Search ............. 248/205.7, 248/205.5, 205.8, 206.2, 362, 363
See application file for complete search history.

(56) References Cited

U.S. PATENT DOCUMENTS

| 2,542,101 | A | * | 2/1951 | Suben | 451/388 |
| 4,133,575 | A | * | 1/1979 | Mader | 296/95.1 |
| 5,192,043 | A |   | 3/1993 | Fa | |
| 5,961,087 | A | * | 10/1999 | Lee | 248/362 |
| 6,478,271 | B1 | * | 11/2002 | Mulholland | 248/205.8 |
| 6,932,306 | B2 | * | 8/2005 | Zou et al. | 248/205.5 |
| 7,475,860 | B2 | * | 1/2009 | Chien et al. | 248/363 |
| 2006/0027720 | A1 | * | 2/2006 | Wu et al. | 248/205.5 |

FOREIGN PATENT DOCUMENTS

| JP | 2004-183879 | 7/2004 |
| KR | 100689014 | 2/2007 |

* cited by examiner

*Primary Examiner*—Anita M King
(74) *Attorney, Agent, or Firm*—IPLA P.A.; James E. Bame

(57) ABSTRACT

Disclosed is a multi-purpose vacuum suction apparatus which can be easily attached to or detached from a smooth and hard object surface and which can substantially increase suction force. The multi-purpose vacuum suction apparatus includes an elastic member for returning one or more operating members to the original positions thereof, and a vacuum suction plate unit having a multi-purpose connector, wherein an ornamental member for use in various ornamentation or advertisement can be fitted into or assembled with the top end of the multi-purpose connector.

5 Claims, 5 Drawing Sheets

MULTI-PURPOSE VACUUM SUCTION APPARATUS

TECHNICAL FIELD

The present invention relates to a multi-purpose vacuum suction apparatus which can be easily attached to or detached from a hard and smooth object surface, and in particular, to a multi-purpose vacuum suction apparatus capable of maximizing the suction force.

BACKGROUND ART

In general, various suction apparatuses have been developed and used so as to hang or attach a towel hanger, a toilet roll hanger, or the like on a hard and smooth object surface, such as a glass surface or a tiled surface. Such suction apparatuses typically include an suction plate adapted to be stuck fast to an object surface so as to create suction force; and an operating plate for pulling the central area of the suction plate so that the bottom face of the central area is lifted from the object surface, thereby producing vacuum between the bottom face and the object surface so as to create suction force.

In this regard, there have been proposed various methods for increasing the suction force created as the vacuum is produced between the central area of the bottom face of the suction plate and the object surface while the central area of the suction plate is being pulled so that the central area of the bottom face is lifted from the object surface. An example of such methods will be described below.

An improved method for allowing a placard anchor to be easily attached to or detached from a smooth and hard object surface, such as a glass surface or a tiled surface, is disclosed in Korean Registered Utility Model No. 400530 in the name of the present applicant, which is entitled Placard Anchor Capable of Being Detachably Attached on Glass Surface.

FIG. 1 is a perspective view showing a main section of a conventional multi-purpose vacuum suction apparatus, and FIG. 2 is an exploded perspective view showing main components of the conventional multi-purpose vacuum suction apparatus.

The conventional multi-purpose vacuum suction apparatus includes at least one vacuum suction means 10, within which a vacuum suction plate unit 11, a lower support die 12, and an suction plate operating member 13 are sequentially combined and assembled; a pole support 20 assembled to the vacuum suction means 10 so that the pole support 20 is rotatable in relation to the vacuum suction means 10, the pole support 20 having a plurality of pole insertion holes 21; and a plurality of poles 22, one end of each pole being inserted into one of the pole insertion holes and the other end being used for anchoring a corner of a place card for desired advertisement or public information.

The vacuum suction means 10 includes: a vacuum suction plate unit 11 formed in a disc shape with a flat bottom face, a lower abutment 12, and an suction plate operating member 13.

The vacuum suction plate unit 11 includes: an suction plate 11A, on which a plurality of anchoring lugs 11A1 are integrally formed on the suction plate and equally spaced from each other along the circumferential direction of the suction plate; and an suction locking knob 11B formed at the center of the vacuum suction plate unit 11.

The lower abutment 12 includes: an annular base ring 12A stuck fast to the circumferential edge area of the top surface of the suction plate 11A; an inclined peripheral wall 12B extending from the internal periphery of the annular base ring 12A, thereby forming a truncated conical wall; a plurality of anchoring lug engaging grooves 12A1 formed along the internal periphery of the inclined peripheral wall 12B and equally spaced from each other, the anchoring lugs 11A1 being engaged with the anchoring lug engaging grooves 12A1, respectively; and a plurality of inclined operating indentations 12C formed along the top edge of the inclined peripheral wall 12B and equally spaced from each other.

The suction plate operating member 13 includes: a first peripheral wall 13A formed in a truncated conical shape and engaged on the outer peripheral surface of the inclined peripheral wall 12B; a plurality of indentation guide projections 13A1 formed on the internal periphery of the first peripheral wall 13A and equally spaced from each other in the peripheral direction; a top base 13B integrally formed on the top end of the first peripheral wall 13A in a flat shape; a second peripheral wall 13C formed in a truncated conical shape and extending from the central area of the top base 13B; an suction locking knob support 13D projecting downward from the central area of the second peripheral wall 13C, the top end of the suction locking knob 11B being inserted into and secured to the bottom end of the suction locking knob support 13D; and a ball joint 13E assembled to the top of the suction locking knob support 13D.

At this time, a soft friction member 14 is anchored to the inner side of the ball joint 13E with a rivet, a screw or the like so as to ensure that the ball joint 13E can be easily inserted into or released from the second peripheral wall 13A, and the orientation of the placard can be easily changed and continuously maintained.

The vacuum suction means 10 is adsorbed in the following manner: the bottom face of the vacuum suction plate unit 11 is made to come into close contact with an object surface, and then the suction plate operating member 13, which is the uppermost member, is pressed and rotated clockwise by the palm of a user's hand, so that the indentation guide projections 13A1 of the suction plate operating member 13 are guided and lifted by the inclined operating indentations 12C, restively. As such, the suction plate operating member 13 is entirely moved away from the object surface.

While the suction plate operating member 13 is spaced from the object surface, the suction locking knob support 13D is also lifted together with the suction plate operating member 13, thereby pulling the suction locking knob 11B. As a result, vacuum is formed between the central area of the vacuum suction plate unit 11 and the object surface, thereby creating suction force.

With the construction of the above-mentioned vacuum suction member 10, the indentation guide projections 13A of the suction plate operating member 13 are slid from the original positions thereof in the operating indentations 12C (the lowest positions of the operating indentations), thereby creating and increasing the suction force.

However, if each of the indentation guide projections 13A1 of the operating member 13 is slid from a position other than the original position (the lowest position), for example, from the middle position of the corresponding operating indentation 12C, the lifting distance of the central area of the suction plate 11A will be relatively short. Consequently, because the suction force created between the central area of the suction plate 11A and the object surface will be relatively weak, it is impossible to expect a sufficient strength of suction force.

In addition, the above-mentioned vacuum suction means is configured so that the poles for anchoring a placard or the like can be assembled to the top of the vacuum suction means. Accordingly, it cannot be variously used, e.g. for ornamentation, advertisement, hangers, etc. except for a specific purpose such as a placard anchor.

DISCLOSURE OF INVENTION

Technical Solution

Accordingly, the present invention has been made to solve the above-mentioned problems occurring in the prior art, and an object of the present invention is to provide a multi-purpose vacuum suction apparatus which can be used for various ornamentation and advertisement purposes, wherein one or more operating members repeatedly rotated so as to attach an suction plate to an object surface are adapted to be always returned to the original positions thereof, thereby maximizing the rotating angle of the operating members so that the suction force created thereby can be substantially increased.

Advantageous Effects

According to the inventive multi-purpose vacuum suction apparatus, because it is possible to release the vacuum condition of the vacuum suction plate unit or to produce again the vacuum condition as desired, the multi-purpose vacuum suction apparatus can be easily attached to or detached from a smooth and hard object surface. As a result, the change of the suction position of the multi-purpose vacuum suction apparatus can be easily and conveniently performed. Moreover, the multi-purpose vacuum suction apparatus can be easily handled and managed.

In addition, because the rotated suction plate operating member is returned to the original position thereof by the elastic force of the elastic member, the maximum suction force can be created when the suction apparatus is attached to an object surface.

Further more, because the multi-purpose connector is provided which allows various ornamental members or the like for use in various ornamentation and advertisement purposes to be removably fitted in the multi-purpose connector, it is possible to variously use the inventive multi-purpose vacuum suction apparatus for advertisement and ornamentation as well as for multi-purpose hanger means.

BRIEF DESCRIPTION OF THE DRAWINGS

The foregoing and other objects, features and advantages of the present invention will become more apparent from the following detailed description when taken in conjunction with the accompanying drawings in which:

FIGS. 6a and 6b are perspective views each showing the inventive multi-purpose suction apparatus partially in horizontal and vertical sections, in which FIG. 6a shows the inventive multi-purpose suction apparatus in the initial status prior to creating suction force, and FIG. 6b shows the inventive multi-purpose suction apparatus in the final status after suction force have been created; and FIGS. 7a and 7b are perspective views showing the operating procedure of the inventive elastic member partially in horizontal section, in which FIGS. 7a and 7b show the initial status and the final status, respectively.

MODE FOR THE INVENTION

Figure 1:
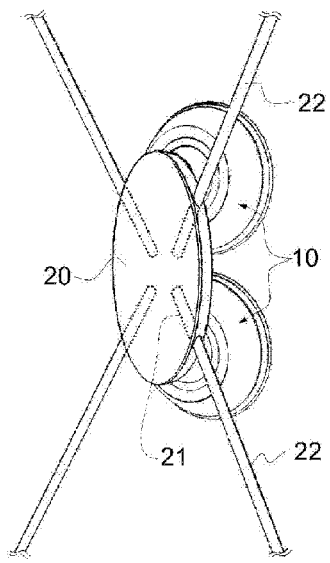
FIG. 1 is a perspective view showing a main part of a conventional suction apparatus.
Figure 2:
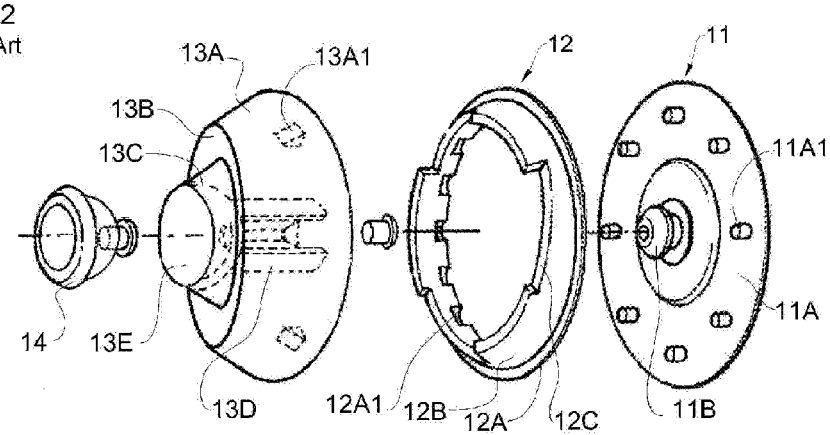
FIG. 2 is an exploded perspective view showing a main structure of the conventional suction apparatus.

In accordance with an aspect of the present invention, there is provided a multi-purpose vacuum suction apparatus, which includes an elastic member for returning one or more operating members to the original positions thereof, and a vacuum suction plate unit having a multi-purpose connector, wherein an ornamental member for use in various ornamentation or advertisement can be fitted into or assembled with the top end of the multi-purpose connector.

The inventive multi-purpose vacuum suction apparatus can be attached to an object surface in a state in which the maximum suction force is exerted by an absorptive plate with a flat bottom face. In addition, the inventive multi-purpose vacuum suction apparatus can be used for the purpose of advertisement and ornamentation as well as hanger means.

The inventive multi-purpose vacuum suction apparatus includes: a disc-shaped suction plate with a flat bottom face, the disc-shaped suction plate having a cylindrical multi-purpose connector projecting from the center of the top of the suction plate; a lower abutment for supporting the vacuum suction plate unit in a state in which it is stacked on the top of the vacuum suction plate unit, the lower abutment being formed with a plurality of inclined indentations arranged along the periphery of the top end thereof and equally spaced from each other; an suction plate operating member stacked on the top of the lower abutment, the suction plate operating member being moved upwardly along the inclined surfaces of the operating indentations while being rotated, thereby pulling the multi-purpose connector of the vacuum suction plate unit upwardly; and an elastic member surrounding connector supports so as to provide elastic force for returning the suction plate operating member to the original position thereof.

That is, the inventive multi-purpose vacuum suction apparatus is included of a vacuum suction plate unit, a lower abutment, an suction plate operating member, and an elastic member, wherein the inventive multi-purpose vacuum suction apparatus is configured in such a manner that an ornamental member usable for various ornamentation and advertisement purposes or the like can be removably fitted into and assembled to the top end of the vacuum suction plate unit. Now, each of the above-mentioned components will be described.

The vacuum suction plate unit of the inventive multi-purpose adsorptive device includes: a disc-shaped soft suction plate with a flat bottom face, the suction plate having a plurality of anchoring lugs arranged along the peripheral area of the top of the suction plate and projecting from the peripheral area; a disc-shaped hard lug locking base projecting from the central area of the suction plate, thereby being stepped from the central area of the suction plate, the locking base being provided with a spring anchoring lug at a side thereof; and a cylindrical multi-purpose connector projecting from the central area of the top of the lug locking base, the multi-purpose connector having a locking ridge formed along and projecting from the periphery thereof.

Preferably, the top of the multi-purpose connector is formed with a vertical hole at the center thereof so as to allow various ornamental members to be fitted into the vertical hole, and the suction plate operating member opposite to the top of the multi-purpose connector is formed with a through-hole at the center thereof.

Herein, the disc-shaped suction plate is formed from a soft material and the central locking lug base including the spring anchoring lug is formed from a hard material, wherein the locking lug base is integrally molded with the soft suction plate.

Therefore, if the locking ridge formed around the outer periphery of the multi-purpose connector provided at the center of the locking lug base is engaged with each of the locking claws of the connector supports of the suction plate operating member and the multi-purpose connector is pulled upward, the vacuum is formed between the central area of the bottom face of the vacuum suction plate unit and an object surface, thereby creating strong suction force between them, whereby the vacuum suction plate unit will be firmly secured to and supported by the object surface.

In addition, the anchoring lugs arranged along the peripheral area of the top of the vacuum suction plate unit are engaged in anchoring lug engaging grooves formed in the lower abutment to be described later, respectively, so as to prevent the lower abutment from being rotated under the influence of torque exerted by the frictional force between the operating indentations and the indentation guide projections while the suction plate operating member is being rotated and the central area of the vacuum suction plate unit is being pulled.

That is, the torque of the suction plate operating member is blocked not to act while the anchoring lugs are engaged in the anchoring lug engaging grooves, respectively. If the torque is directly transferred to the vacuum suction plate unit, the vacuum suction plate unit is slip on the object surface, thereby disturbing the formation of a vacuum condition.

In addition, the lower abutment includes: an annular base ring stuck fast to the peripheral area of the top of the suction plat, a cylindrical wall projecting vertically upward from the peripheral edge of the base ring, and a plurality of inclined operating indentations formed on and equally spaced from each other along the top end of the cylindrical wall.

The base ring comes into close contact with and supports the peripheral area of the vacuum suction plate unit forming vacuum. That is, the base ring is a main component for tightly supporting the outermost peripheral area of the disc-shaped vacuum suction plate unit having a flat bottom face, thereby rendering the suction force at its maximum, wherein the suction force is created by the vacuum produced while the locking lug base on the central area of the vacuum suction plate unit is pulled upward.

In addition, the inclined operating indentations arranged and equally spaced along the top end of the cylindrical wall of the base ring are formed with projection seating grooves on the bottom surfaces thereof, into which the indentation guide projections are received, respectively, so that if the indentation guide projections are guided along the inclined surfaces of the operating indentations and then the indentation guide projections are received in and maintained by the projection seating grooves while the suction plate is rotated, the suction plate operating member will be rotated and moved away from the object surface. As a result, the locking lug base of the vacuum suction plate unit engaged with the suction plate operating member is pulled upwardly.

The suction plate operating member of the inventive multi-purpose vacuum suction apparatus includes: a cylindrical wall fitted on the outer periphery of the cylindrical wall of the lower abutment; a plurality of indentation guide projections formed on the internal periphery of the cylindrical wall of the operating member and equally spaced from each other in the peripheral direction; a horizontal upper base integrally formed with the cylindrical wall of the operating member at the top end of the cylindrical wall, the upper base having a through-hole formed at the center thereof; and a plurality of connector supports downwardly projecting from the peripheral area of the through-hole of the upper base, the lower ends of the connector supports being engaged with the locking ridge on the connector.

Each of the connector supports has an L shaped locking piece 54a at the lower end thereof, the locking piece 54a having a locking claw projecting to be centrally oriented, so that the locking pieces 54a of the connector supports are arranged in a circular form. The locking ridge on the connector is rotationally engaged with the locking claws of the connector supports, so that the locking lug base can be pulled.

The elastic member of the inventive multi-purpose vacuum suction apparatus extends downward from the peripheral edge area of the through-hole of the suction plate operating member in a cylindrical shape so as to surround the connector supports, the opposite ends of the elastic member being anchored to a gap between two adjacent connector supports, and to the spring anchoring lug S of the suction plate, respectively. The elastic member can be implemented by an elastic spring.

The elastic member serves to return the indentation guide projections to the original positions thereof, so that the indentation guide projections are always slid from the lowest points, which are the original positions thereof in the operating indentations of the lower abutment. When assembling the elastic member, it is necessary to assemble the elastic member in a state in which it is wound by a predetermined number of turns around the outer periphery of the connector supports so that the elastic member exerts elastic force rendering the indentation guide projections always to be returned to the original positions thereof in the operating indentations of the lower abutment.

Hereinafter, preferred embodiments of the inventive multi-purpose vacuum suction apparatus will be described with reference to the accompanying drawings. In the following description and drawings, the same reference numerals are used to designate the same or similar components.

Figure 3:
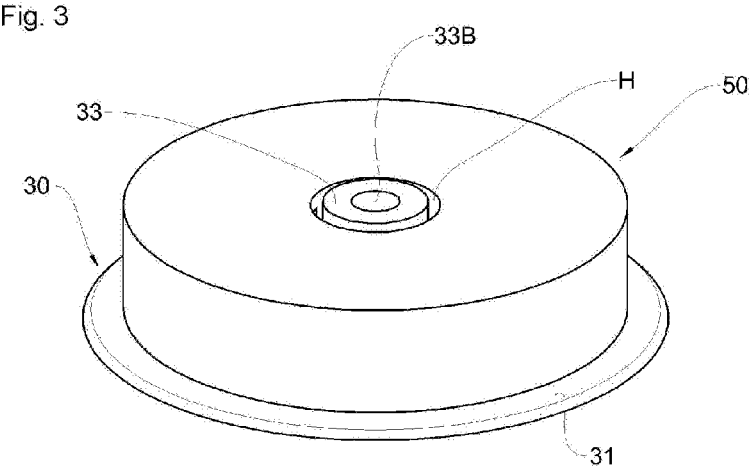
FIG. 3 is a perspective view of the inventive multi-purpose vacuum suction apparatus.
Figure 4:
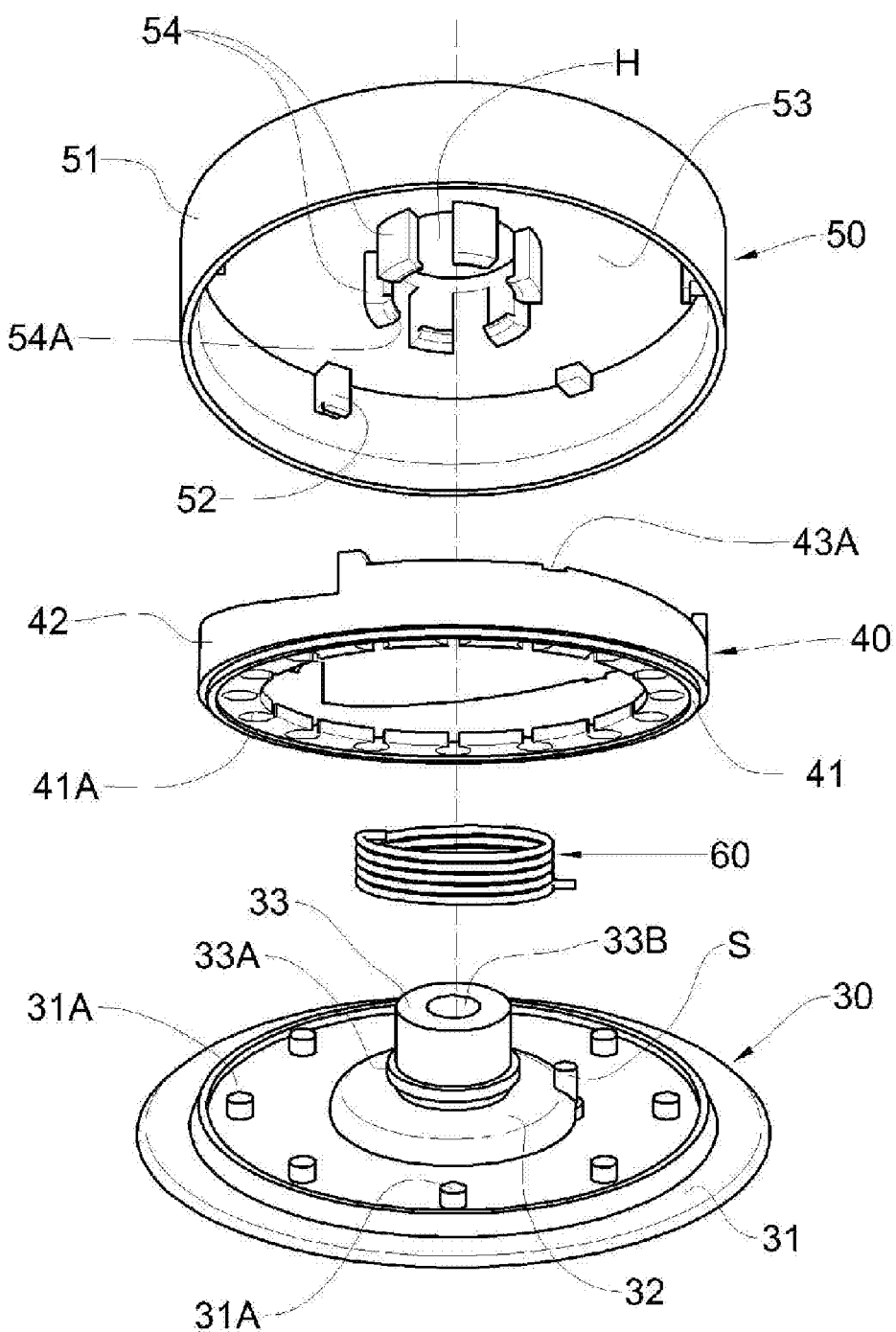
FIG. 4 is an exploded perspective view of the inventive multi-purpose vacuum suction apparatus.
Figure 5A:
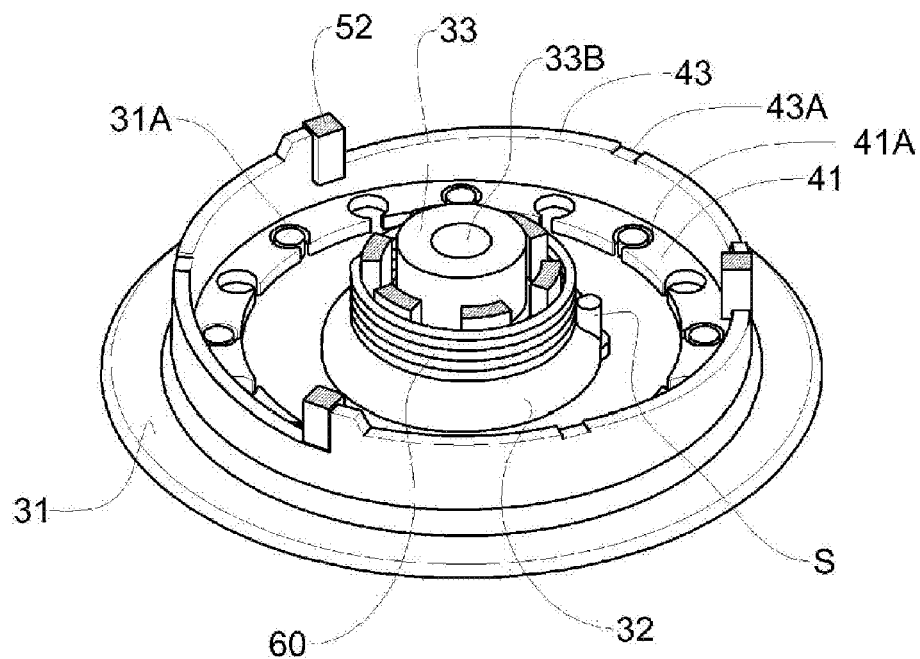
FIGS. 5a and 5b are perspective views showing the inventive multi-purpose suction apparatus partially in horizontal and vertical sections, respectively.
Figure 5B:
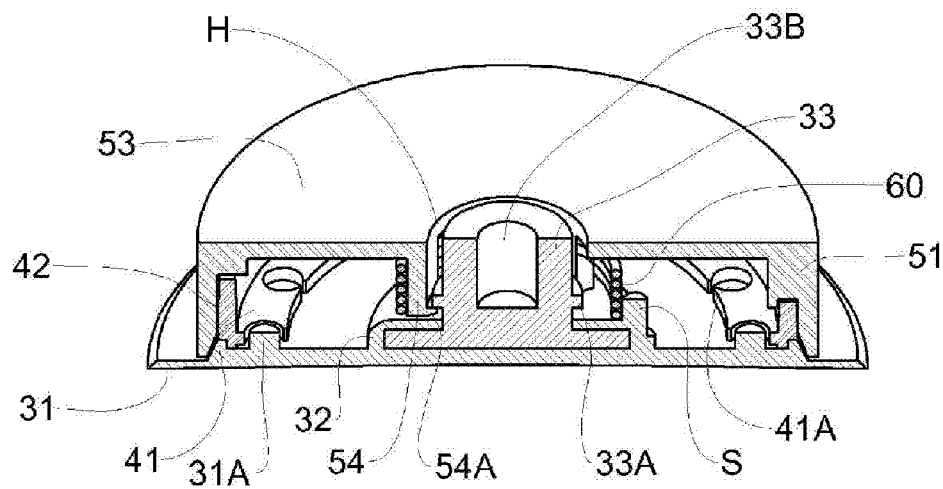
Figure 6A:
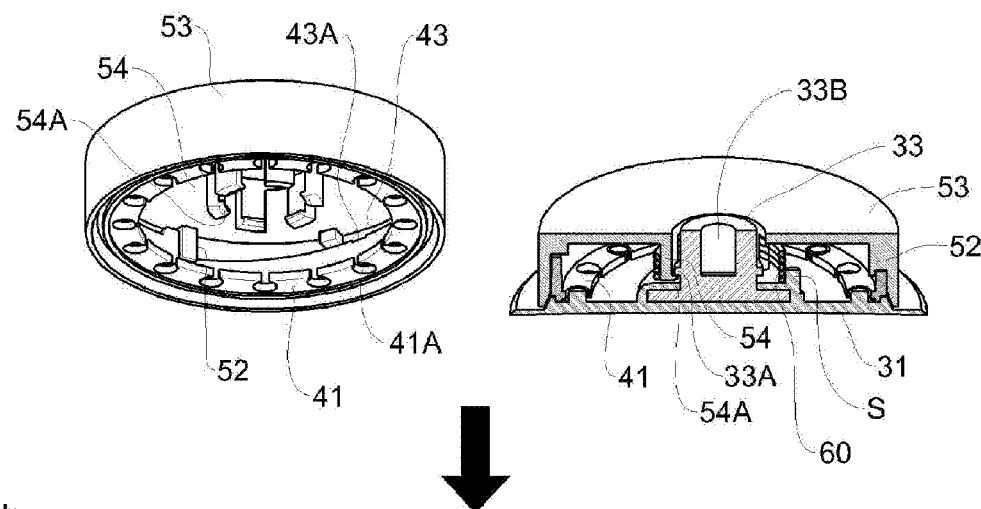
Figure 6B:
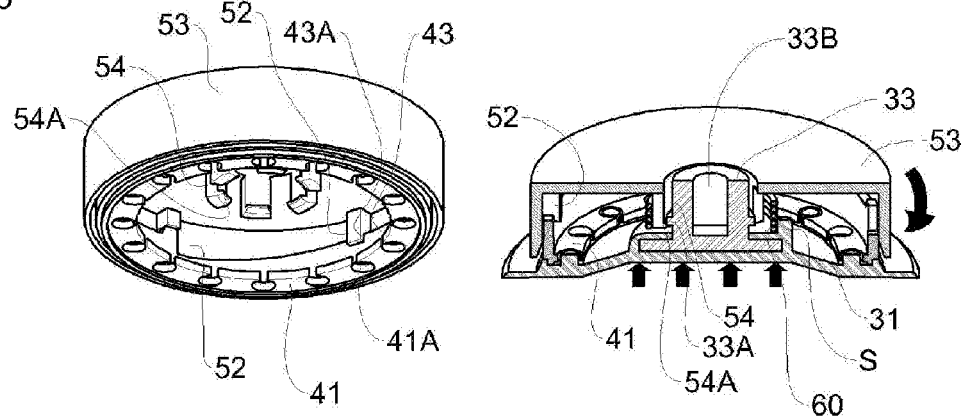

FIG. 3 is a perspective view of the inventive multi-purpose vacuum suction apparatus, and FIG. 4 is an exploded perspective view of the inventive multi-purpose vacuum suction apparatus. FIGS. 5a and 5b are perspective views showing the inventive multi-purpose suction apparatus partially in horizontal and vertical sections, respectively. In addition, FIGS. 6a and 6b are perspective views each showing the inventive multi-purpose suction apparatus partially in horizontal and vertical sections, in which FIG. 6a shows the inventive multi-purpose suction apparatus in the initial status prior to creating suction force, and FIG. 6b shows the inventive multi-purpose suction apparatus in the final status after suction force have been created.

As shown in the drawings, the inventive multi-purpose vacuum suction apparatus includes a vacuum suction plate unit 30, a lower abutment 40, an suction plate operating member 50, and an elastic member 60.

The vacuum suction plate unit 30 includes: a disc-shaped suction plate 31 with a flat bottom face; a plurality of anchoring lugs 31A projecting from the peripheral area of the top of the suction plate 31 and arranged in the circumferential direction of the suction plate 31; a locking lug base 32 projecting from the central area of the top of the suction plate 31, thereby being stepped from the central area, the locking lug base 32 being formed with a spring anchoring lug S at a side of the top thereof; and a cylindrical multi-purpose connector 33 projecting from the center of the top of the locking lug base 32, the multi-purpose connector 33 having a locking ridge 33A projecting from the periphery of the multi-purpose connector 33, and a vertical hole 33B coaxially formed in the multi-purpose connector 33.

The lower abutment 40 includes: an annular base ring 41 stuck fast to the peripheral area of the top of the suction plate 30, the annular base ring 41 having a plurality of anchoring lug engaging grooves 41A formed along the internal periphery of thereof, the anchoring lugs 31A being engaged in the engaging grooves 41A, respectively; a cylindrical wall 42 projecting vertically upward from the peripheral edge of the base ring 41; and a plurality of inclined operating indentations 43 formed along the top of the cylindrical wall 42 and equally spaced from each other.

The suction plate operating member 50 includes: a cylindrical wall 51 fitted on the outer peripheral surface of the cylindrical wall 42 of the lower abutment 40; a plurality of indentation guide projections 52 formed on the internal periphery of the cylindrical wall 51 and equally spaced from each other in the peripheral direction, the indentation guide projections 52 being guided in the operating indentations 43, respectively; a flat upper base 53 integrally formed on the top end of the cylindrical wall 51 and having a through-hole H at the center thereof; and a plurality of connector supports 54 extending downward from the peripheral edge area of the through-hole H of the upper base 53, the connector supports 54 being engaged with the locking ridge 33A.

In addition, the elastic member 60 wounded to form a cylindrical shape surrounds all of the connector supports 54 projecting downward from the peripheral edge area of the through-hole H, the opposite ends of the elastic member being anchored to a gap between two adjacent connector supports 54, and the spring anchoring lug S.

Now, the procedure before and after attaching the vacuum suction plate unit of the multi-purpose vacuum suction apparatus configured as described above will be described. In the state in which the indentation guide projections 52 of the suction plate operating member 50 are positioned at the lowest areas of the inclined operating indentations 43, respectively, as shown in FIG. 6, a user grasps and rotates clockwise the cylindrical wall 51 of the suction plate operating member 50 with a hand while pressing the upper base 53.

If the upper base 53 is rotated in this manner, the indentation guide projections 52 integrally formed on the cylindrical wall 51 of the suction plate operating member 50 are slid along the inclined surfaces of the operating indentations 43 on the lower abutment 40 and gradually moved upward, whereby the locking ridge 33A of the vacuum suction plate unit 30 is pulled upward. Herein, the locking ridge 33A is engaged with the connector supports 54 provided at the central area of the upper base 53 of the suction plate operating plate 50.

If the locking ridge 33A is pulled, the bottom of the central area of the suction plate 31 of the vacuum suction plate unit 30 is lifted. As a result, vacuum is produced between the object surface and the suction plate 31, whereby suction force is created.

With the inventive multi-purpose vacuum suction apparatus, the indentation guide projections 52 of the suction plate operating member 50 are moved from the lowest position to the highest position in the inclined operating indentations 43, respectively, whereby the bottom of the central area of the suction plate 31 of the vacuum suction plate unit 30 is lifted from the flat state in the lowest position to the highest position. As a result, the suction force created by the vacuum can be substantially increased.

The elastic member 60 plays the most important role in creating and substantially increasing the suction force as mentioned above whenever the inventive adsorptive device is used. Now, the action of a spring which may be employed as the elastic member in the present invention will be described by way of an example.

Figure 7A:
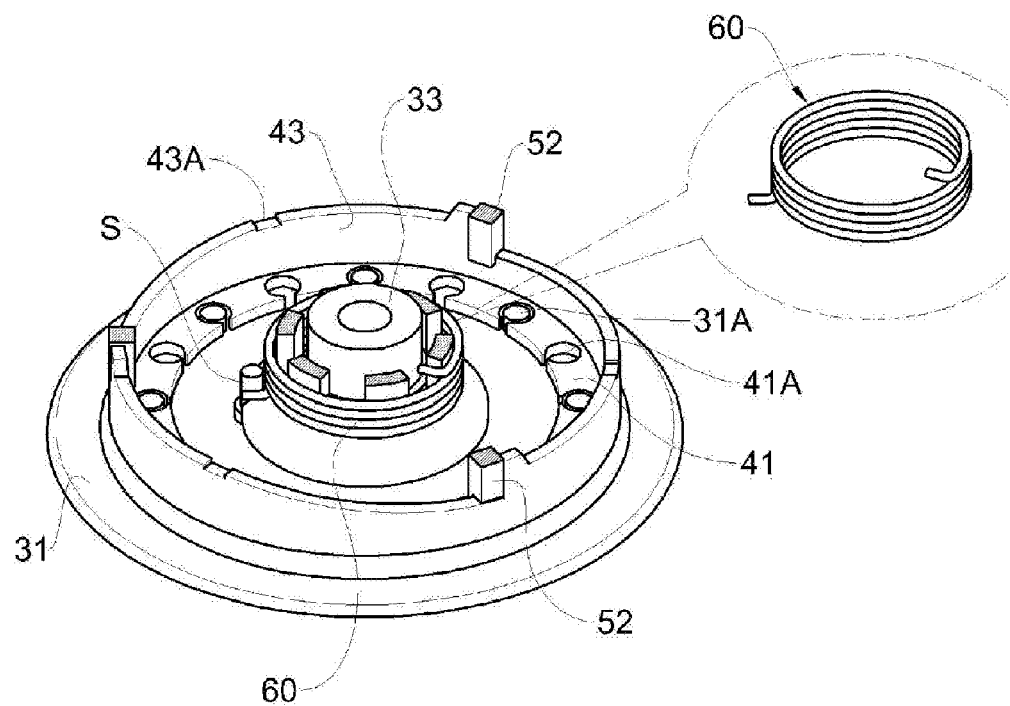
Figure 7B:
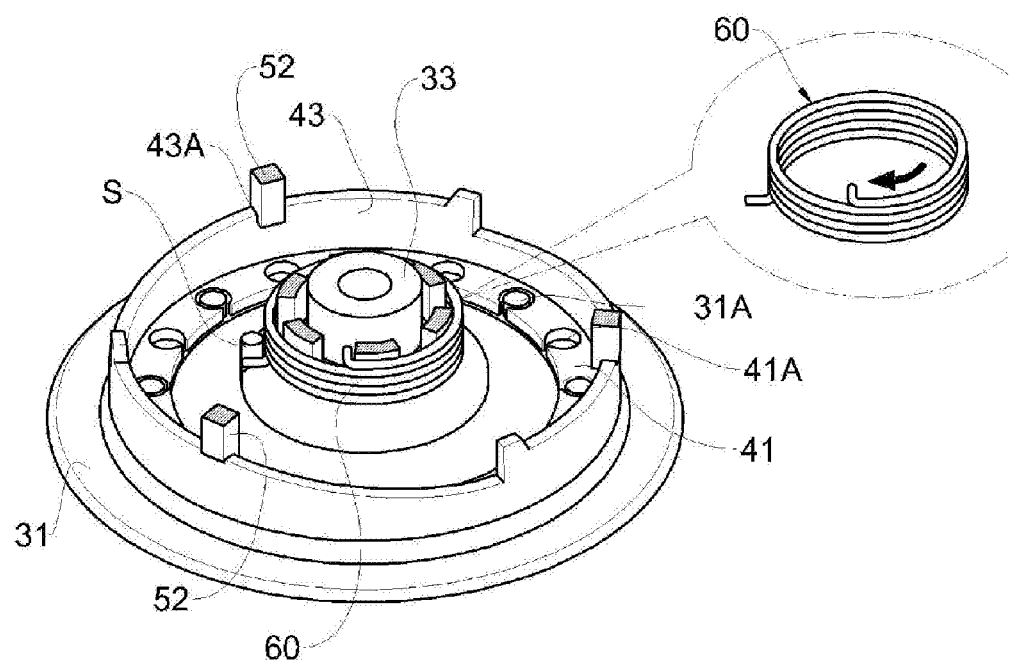

FIGS. 7a and 7b show the operating procedure of the inventive elastic member, in which FIG. 7a shows the initial status and FIG. 7b shows the final status.

As shown in the drawings, the inventive elastic member 60 serves to return the indentation guide projections 52 of the suction plate operating member 50 to their original positions so that the indentation guide projections 52 are always slid from the lowest positions, which are the original positions in the operating indentations 43 of the lower abutment 40. One end of the elastic member 60 is anchored to the spring anchoring lug S and the other end is anchored between two adjacent connector supports 54. When the inventive multi-purpose vacuum suction apparatus is initially assembled, the elastic member 60 is assembled in a state in which it is wounded by a predetermined number of turns, so that the elastic member exerts elastic force for rendering the indentation guide projections 52 to be always returned to their original positions.

Therefore, after using the inventive suction apparatus attached to an object surface by the suction force created by rotating the absorption operating member 50 clockwise, if it is desired to release the suction force, the indentation guide projections 52 on the cylindrical wall 51 of the suction plate operating member 50 are downwardly slid in the operating indentations 43 by the restoration force of the elastic member 60, and finally positioned at the lowest positions in the operating indentations 43, respectively.

In the subsequent use of the inventive multi-purpose vacuum suction apparatus, the indentation guide projections 52 will be maintained in the state in which they are returned to their original positions, so that they can be always slid from the lowest positions in the operating indentations 43 of the lower abutment, which are the original positions of the operating indentations 43.

In addition, an ornamental member (not shown), a hanger member or the like may be fitted into the multi-purpose connector 33 of the vacuum suction plate unit 30, wherein the multi-purpose connector 33 is exposed to the outside through the through-hole H of the suction plate 50. Therefore, it is possible to use the inventive multi-purpose vacuum suction apparatus for advertisement and ornamentation purposes as well as for hanger means, depending on which form the ornamental member, the hanger member or the like takes.

Although preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A multi-purpose vacuum suction apparatus comprising:
a vacuum suction plate unit (30) comprising a disc-shaped suction plate (31) with a flat bottom face, a cylindrical multi-purpose connector (33) projecting from the center of the top of the suction plate (31), the multi-purpose connector (33) having a locking ridge (33A) formed along and projecting from the periphery of the multi-purpose connector (33), a central vertical hole (33B) coaxially formed in the multi-purpose connector (33), and a spring anchoring lug (S) provided on the top of the suction plate (30) at a side of the multi-purpose connector (33);
a lower abutment (40) comprising an annular base ring (41) stuck fast to the peripheral area of the top of the suction plate (30), a cylindrical wall (42) projecting vertically upward from the peripheral edge of the base ring (41), and a plurality of inclined operating indentations (43) formed along the top of the cylindrical wall (42) and equally spaced from each other;

an suction plate operating member (50) comprising a cylindrical wall (51) fitted on the outer peripheral surface of the cylindrical wall (42) of the lower abutment (40), a plurality of indentation guide projections (52) formed on the internal periphery of the cylindrical wall (51) and equally spaced from each other in the peripheral direction, the indentation guide projections (52) being guided on the inclined surfaces of the operating indentations (43), respectively, a horizontal and flat upper base (53) integrally formed on the top end of the cylindrical wall (51) and having a through-hole (H) at the center thereof, and a plurality of connector supports (54) extending downward from the peripheral edge area of the through-hole (H) of the upper base (53), the lower ends of the connector supports (54) being engaged with the locking ridge (33A); and an elastic member (60) surrounding all of the connector supports (54) projecting downward from the peripheral edge area of the through-hole (H) and arranged in a circular form, one end of the elastic member being anchored to a gap between two adjacent connector supports (54), and the other end being anchored to the spring anchoring lug (S) of the suction plate (31).

2. The multi-purpose vacuum suction apparatus as claimed in claim 1, wherein the vacuum suction plate unit (30) further comprises a plurality of anchoring lugs (31A) formed along the peripheral area of the top of the suction plate (31) and projecting from the top of the suction plate (31), and the base ring (41) of the lower abutment (40) stuck fast to the peripheral area of the top of the suction plate (30) further comprises a plurality of anchoring lug engaging grooves (41A) formed along the internal periphery of the base ring (41), the anchoring lugs (41a) being engaged in the anchoring lug engaging grooves (41A), respectively.

3. The multi-purpose vacuum suction apparatus as claimed in claim 1, wherein each of the operating indentations (43) of the lower abutment (40) is formed with a projection seating groove (43A) at the top end thereof, in which a corresponding indentation guide projection is received.

4. The multi-purpose vacuum suction apparatus as claimed in claim 1, wherein each of the connector supports (54) of the suction plate operating member (50) has an 'L-shaped' locking piece (54A), one end of which is centrally oriented, so that the locking pieces (54A) are engaged with the locking ridge (33A) of the connector (33) of the vacuum suction plate unit (30).

5. The multi-purpose vacuum suction apparatus as claimed in claim 1, wherein the elastic member (60) comprises a spring.

* * * * *